United States Patent [19]

Whipps

[11] 4,004,460
[45] Jan. 25, 1977

[54] SHIP MOVEMENT MEASUREMENT

[75] Inventor: Sydney L. Whipps, Doddinghurst, England

[73] Assignee: Shell Oil Company, Houston, Tex.

[22] Filed: Oct. 14, 1975

[21] Appl. No.: 621,783

[30] Foreign Application Priority Data

Oct. 24, 1974 United Kingdom ............ 46032/74

[52] U.S. Cl. .............................................. 73/178 R
[51] Int. Cl.² ........................................ G01C 21/00
[58] Field of Search ......... 73/178 R, 181; 340/3 D; 244/77 E, 77 B

[56] References Cited

UNITED STATES PATENTS

| 3,133,520 | 5/1964 | Bentkowsky | 73/178 R |
| 3,277,430 | 10/1966 | Hagemann et al. | 73/178 R |

Primary Examiner—Donald O. Woodiel

[57] ABSTRACT

A method and apparatus for measuring and displaying the movement of a ship wherein the longitudinal and lateral velocity of the ship are measured. The longitudinal and lateral velocities are combined with the rate-of-turn of the ship to provide indications of the lateral movement of the ship at a plurality of locations in combination with the longitudinal movement of the ship.

6 Claims, 5 Drawing Figures

SHIP MOVEMENT MEASUREMENT

CROSS-REFERENCE TO RELATED APPLICATION

The present application is related to a co-pending application of the same inventor entitled "Measuring Rate-of-Turn On Board Of Ships" filed June 25, 1975, Ser. No. 590,790 now U.S. Pat. No. 3,967,499.

BACKGROUND OF THE INVENTION

The present invention concerns a method as well as a system for determining the movement of a ship.

For successful navigation within minimum associated risk it is necessary to be informed of all ship movements that occur. Ship movement may be the result of self-derived forces generated by one or more propellers and by one or more rudders, or they may be the result of forces due to wind, waves and current. Irrespective of their cause, it is important that the navigator is informed of all movement in order to be able to accomplish successful maneuvers with the ship, such as approaching a harbor, berthing the ship along a jetty, approaching and contacting another ship or a single point mooring and/or anchoring.

Systems for determining ship movements are known, however, none of these provide sufficient and accurate information under all the above-mentioned circumstances.

In one such known system use is made of two master radars, which are placed on a jetty and connected to a computer. These radars cooperate with two transponders onboard the ship at accurately known positions.

The master radars transmit interrogating pulses in turn on the same frequency, the first transponder replies on a second frequency and the other transponder on a third frequency. In this way, the radars can be used to measure the ranges between the radars and each of the transponders and these measurements fed into the computer make it possible to calculate the bow range of the ship, its stern range together with the velocities and accelerations. In addition, the computer calculates the angle $\phi$ which the center line of the ship makes with that of the jetty and the rate of the change of the angle $\phi$.

This system is restricted in its application as it can only be used at those locations where master radars are present. It is not able to provide ship movement information in open ocean conditions neither the vital information required during transits through hazardous channels affected by strong and varying cross-currents and winds.

In one other system, use is made of two acoustic transducers located through the bottom hull of the ship, one at each end. Theoretically, this system has the advantage of being independent of any device external to the ship but in practice, it is found that hull and/or propeller induced aeration and/or cavitation beneath the stem of the ship causes the aft located transducer to fail under certain circumstances and particularly when maneuvering. Also, it is costly to install two transducer assemblies.

BRIEF SUMMARY OF THE INVENTION

It is a first object of the present invention to provide a method and a system for determining the movement of a ship with a high accuracy and under practially all possible conditons, so as to inform the navigator about the movement of the ship at different locations onboard the ship.

It is a second object of the present invention to provide a method and a system for accurately determining the horizontal movement occurring at different stations onboard the ship by means of a self-contained system able to function under all operational conditions without reference to devices external to the ship.

It is a further object of the present invention to provide the data regarding the ship movement in a simple and effective way, so as to enable the navigator to interpret these data without requiring him to make additional calculations.

These data will be preferably provided at one or more locations onboard the ship, for instance in the wheelhouse of the ship.

Although the invention can be used in connection with all kinds of ships, i.e., sea-going vessels as well as river-boats and large, as well as small ships, it is of particular significance of very large and ultralarge ships, for instance very large crude carriers, which may measure more than 300 meters between bow and stern.

The method for determining the movement of a ship according to the present invention comprises measuring the longitudinal and the lateral velocity of the ship at an aeration-free location at the bottom of the ship, measuring the rate-of-turn of the ship about its vertical axis; generating signals representing each of these measured values; displaying the signals representing the longitudinal velocity and that representing the rate-of-turn; deducing from the signals representing the said lateral velocity and the rate-of-turn in combination with a factor representing the longitudinal component of the distance between a chosen station onboard the ship and the said aeration-free location, a signal representing the lateral speed of the ship at said chosen station and displaying the signal representing the lateral speed at said chosen station.

The invention further concerns a system for determining the movement of a ship comprising a velocity transducer arrangement in the bottom of the ship; including two elements arranged to detect lateral and longitudinal velocity of the ship at the position of the transducer arrangement; a rate-of-turn transducer mounted onboard the ship, means for transmitting the signals generated by these transducers to at least one central location and means at that location for processing and/or displaying at least some of these signals.

The longitudinal and the lateral speed of the ship may be measured by means of a sonar doppler log which operates on the principle that a sonar signal transmitted from a moving object and reflected back from a stationary surface will indicate a shift in frequency; this shift in frequency is proportional to the speed relative to the stationary surface of the moving object, which in this case will be the ship. The stationary surface will be either the sea bed, in water depths from typically 2 to 200 meters, or at all greater depths, the mass of water beyond turbulent or wake effects caused by the moving ship, i.e., the stable water layer well below the hull of the ship. Therefore, the frequency of the returned signal is compared to the transmitted frequency and the ship's speed is computed from the difference. The sonar signal is transmitted from a small transducer attached to the ship's hull. The sonar energy is reflected from the sea bottom or from small scatterers which are present in all waters.

In the system according to the present invention use is preferably made of a dual-axis sonar doppler log, i.e., a log having two transducers at right angles, of which one may be mounted in the bottom of the ship parallel to the longitudinal axis of the ship, thus providing a signal representing the longitudinal velocity of the ship, the other in this case thus provides a signal representing the lateral velocity of the ship.

Alternatively, it is possible to mount the transducers at angles of 45° with the axis of the ship in which case the combination of signals will provide the longitudinal and lateral velocity signals.

It has been found that the transducer arrangement cannot be fixed to the hull of the ship at any location as the signal propagation may not be interrupted by air bubbles or voids which may occur underneath the ship. In general, the transducer arrangement need be fixed to the hull at an aeration-free location, i.e., a location where the occurrence of air bubbles and/or voids is less likely.

The rate-of-turn of the ship about its vertical axis may be determined by means of a rate-of-turn sensor including a tuning fork together with means for maintaining the fork in vibration and means for detecting and measuring torsional oscillations set up in the stem of the fork, which oscillations are a measure for the rate-of-turn of the ship. The type of rate-of-turn transducer is described and claimed in the above-referenced co-pending application.

In the system according to the invention, use is preferably made of a display unit including an integrated display cross which is comprised of a horizontal bar and a vertical bar, which can move against respectively a vertical scale and a horizontal scale for indicating the longitudinal and the lateral velocity of the ship and a drift angle scale cooperating with the point of intersection of the two said bars for indicating the angle of drift of the center of gravity of the ship.

BRIEF DESCRIPTION OF THE DRAWINGS

The invention will now be explained with reference to the drawings, wherein.

BRIEF SUMMARY OF THE INVENTION

Figure 1:
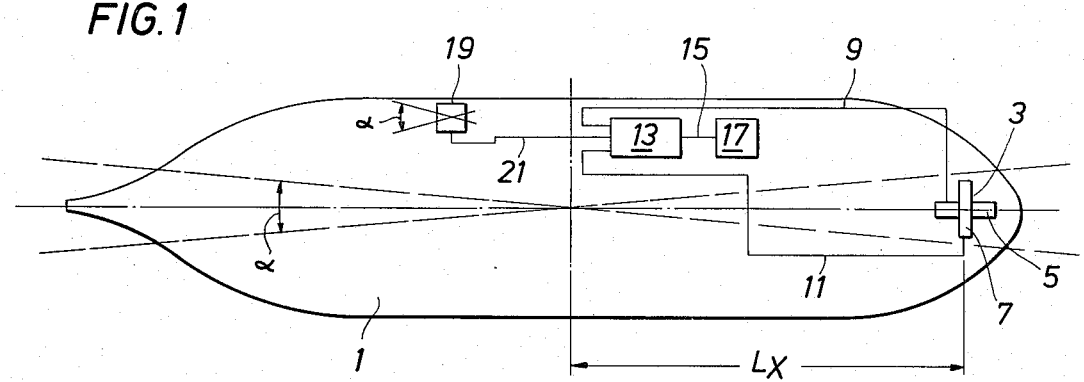
FIG. 1 shows schematically a ship equipped with a system for determining the movement of a ship in accordance with the present invention.

The ship 1 of FIG. 1 is equipped with a velocity transducer arrangement, such as a dual-axis doppler log 3 including two elements 5 and 7, which in this example are fixed at right angles with respect to each other. In this configuration, the element 5 provides a signal representing the longitudinal speed of the ship 1, likewise the element 7 provides a signal representing the lateral velocity of the ship 1. These signals are fed through means 9 and 11 respectively into a processor 13, which will be discussed with reference to FIG. 2, and which is connected via means 15 with a display 17, which will be discussed with reference to FIGS. 3a and 3b. The ship is further equipped with a rate-of-turn transducer, providing a signal representing the rate-of-turn of the ship 1 via means 21 into processor 13. The figure further shows that the ship 1 yaws over an angle alpha, which may be about 1 degree and that the distance between the location of the transducer arrangement in the bottom of the ship 1 and the midship station equals $L_x$.

Figure 2:
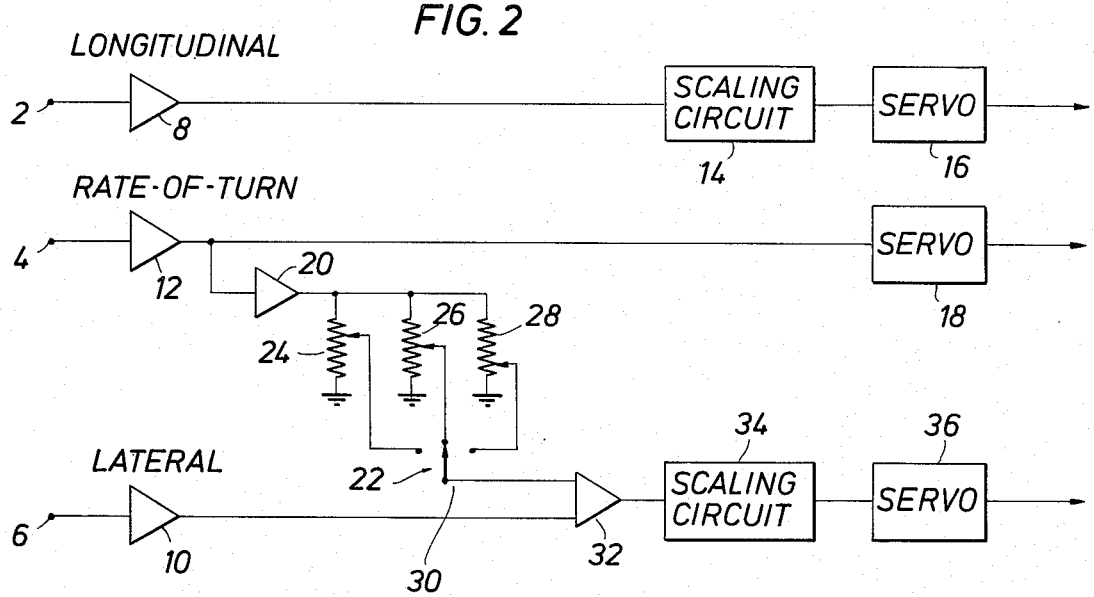
FIG. 2 shows schematically a processor which may be used in a system according to the present invention.

Referring to FIG. 2, the processor 13 has three inputs 2, 4 and 6 for the signal representing the longitudinal speed of the ship, the signal representing the rate-of-turn of the ship about its vertical axis, and the signal representing the measured lateral speed of the ship, respectively.

The signal representing the longitudinal velocity of the ship is fed into input 2 of an adjustable buffer amplifier 8, and the other signal representing the lateral velocity of the ship is fed into input 6 of a second adjustable buffer amplifier 10.

The signal representing the rate-of-turn of the ship about its vertical axis is fed into the input 4 of a third adjustable buffer amplifier 12.

The buffer amplifiers 8, 10 and 12 have adjustable gain in order to accommodate different transducer sensitivities.

The output signal of amplifier 8 representing the forward/aft velocity of the ship is fed through a scaling circuit 14 into a servo system 16 which serves for driving a pointer on a display shown in FIG. 3.

The output signal of the amplifier 12, which represents the rate-of-turn of the ship is fed into a second servo system 18, which serves for driving a second pointer on the above-mentioned display. This signal, however, is also fed into an operational amplifier 20, which is connected to an arrangement which is comprised of a selection switch 22 and three pre-set potentiometers 24, 26 and 28, representing the stern, midship and bow of the ship, but not necessarily in respective order, and which serve to introduce to the rate-of-turn signal the three longitudinal components of the distance between the stated three positions onboard the ship and the location of the velocity transducer.

The signal which appears at the terminal 30 of the switch 22 is fed to a summing amplifier 32 receiving at its other input the output signal from the buffer amplifier 10, which signal represents the lateral speed at that location of the ship, where the velocity transducer has been fixed to the hull of the ship. The output of the amplifier 32 is fed through a scaling circuit 34 to a third servo system 36 which serves to adjust a third pointer on the display of FIG. 3.

This part of the processor 13 operates as follows: the signal $\dot{\theta}$ representing the rate-of-turn of the ship is the input to the amplifier 20, wherein it is processed such that at the output of 20 a signal exists that is representative of a velocity $V_{m1}$: this being the linear velocity experienced at the end of a lever of length $L_{max}$ due to a turning rate of $\dot{\theta}$ ($L_{max}$ is chosen to be always greater than the overall length of the ship).

Potentiometers 24, 26 and 28 serve to attenuate the output signal of the amplifier 20 to provide, at points $x$, $y$ and $z$, signals representative of linear velocities experienced at lever lengths of less than $L_{max}$. According to the pre-set values of potentiometers 24, 26 and 28, signals exist at points $x$, $y$ and $z$, representative of the relative velocity of stations aboard the ship which are remote from the lateral velocity transducer. Thereafter, depending on the position selected by switch 30 any one of these signals is arithmetically summed in amplifier 32 with the signal derived from the lateral velocity transducer to provide, at the output of amplifier 32, a signal representative of the absolute lateral velocity of the station selected.

Suitable provision is made (not shown) to ensure that the logic of the process is not affected by the variation in signal polarity vs. sense of direction existing in different acoustic logs of rate transducers. Also, provision is made to introduce the necessary inversion in cases where it is necessary to install the lateral velocity transducer in the stern of a ship.

When a ship operates in open-sea conditions, it will experience dynamic movements in addition to quasi-static movements. For example, it is not uncommon for a ship to yaw about the mean course by 0.5° at a periodicity of about 10 seconds. It may be shown that a dynamic movement of this nature will cause cyclic turning rates of up to 18°/min. and cyclic lateral velocities at the bow and stern of up to 0.5 knots on a ship of 300 ft. overall length. In order to preserve the "readability" of the display of such data as rate-of-turn and lateral velocity, it will be essential to introduce suitable damping.

The necessity for damping is unfortunate as it conflicts with the desire to display meaningful changes which may occur in quasi-static situations without delay. However, it has been discovered that the above-described summation technique will, when the midship station presentation is selected, cause the oscillatory rate-of-turn signal to cancel the oscillatory lateral velocity signal, thereby permitting the absolute velocity of the said midships station to be displayed without the need for signal damping, which may be understood from the following.

Assuming that, notwithstanding the above given example, the signal at the output of the multiplifer 20 is $\dot{\theta}$ and the potentiometer arrangement has been made in such a way that this signal by means of a potentiometer is multiplied with a factor representing the distance between the lateral velocity transducer location and the chosen station, then in case of the midship station the signal at the switch 30 (see also FIG. 1) will be equal to $L_x \cdot \dot{\theta}$.

However, due to the above-mentioned dynamic movement, the signal from the rate-of-turn transducer will be $\dot{\theta} \pm \Delta \dot{\theta}$ and consequently the signal at the switch 30 will be $L_x(\dot{\theta} \pm \Delta \dot{\theta})$. Likewise, the output signal from the lateral velocity transducer will be $V_L \pm \Delta V_L$, due to the above-mentioned cyclic lateral velocities. The signal at the output of the summation amplifier 32 will therefore be equal to:

$$(V_L \pm \Delta V_L) \pm L_x(\dot{\theta} \pm \Delta \dot{\theta}) = V_L + L_x \cdot \dot{\theta} \pm (\Delta V_L + L_x \cdot \Delta \dot{\theta})$$

and since $\Delta V_L = -L_x \cdot \Delta \dot{\theta}$, the output signal will be $$V_L + L_x \cdot \dot{\theta}$$

which is the lateral velocity at the midship station.

Figure 3A:
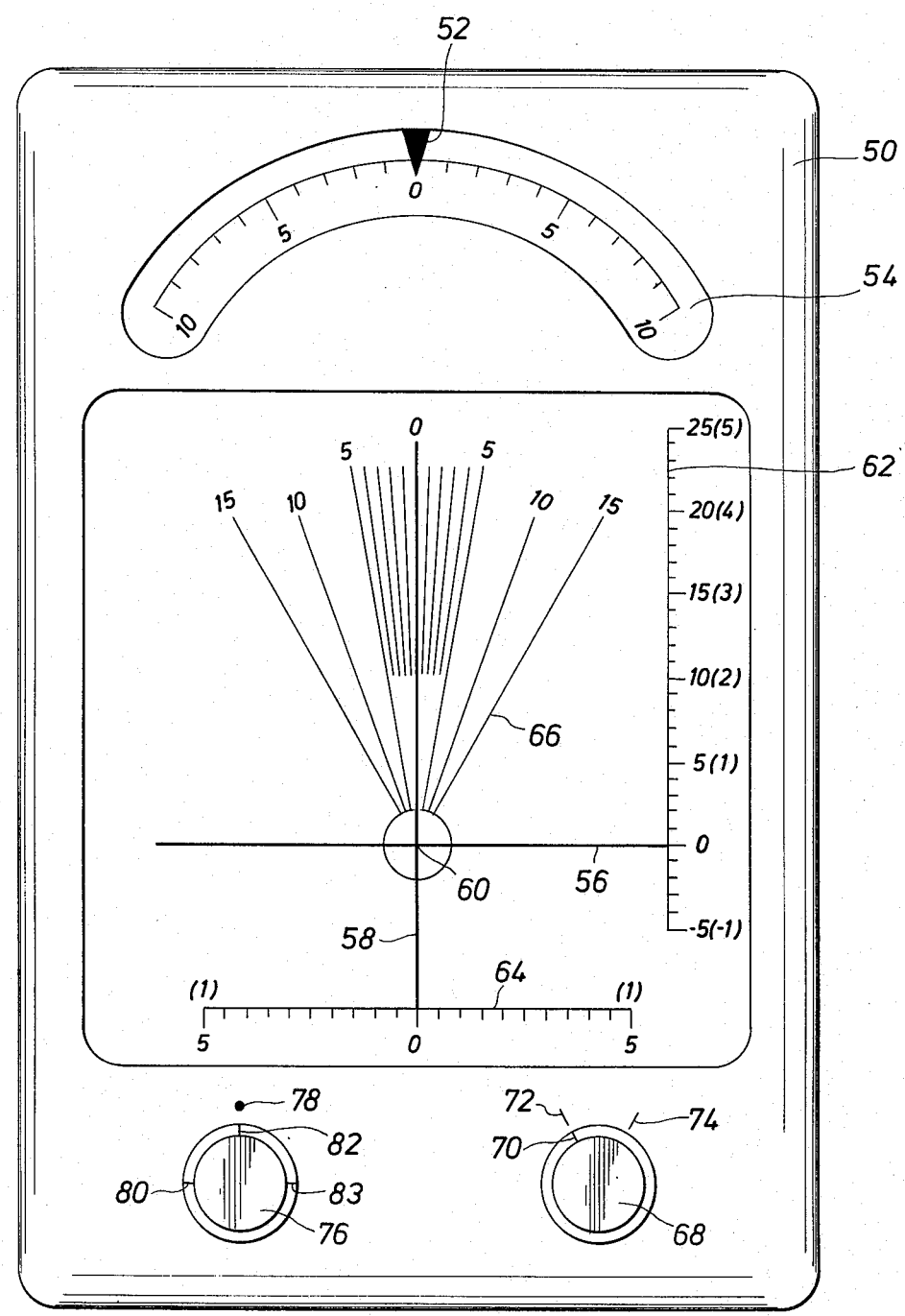
FIGS. 3a and 3b show a display which is preferably used in a system according to the present invention.
Figure 3B:
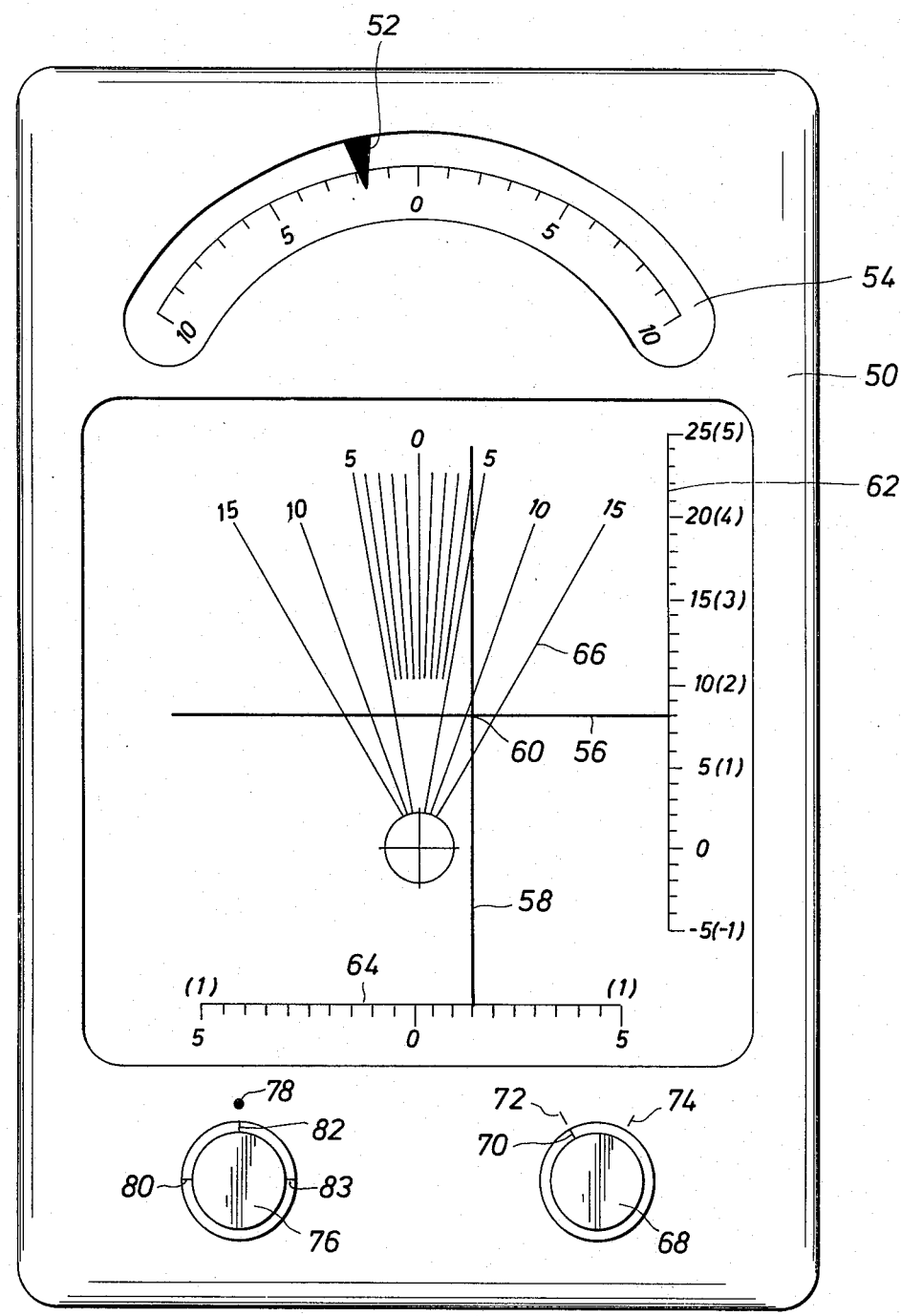

A display as shown in FIGS. 3a and 3b is particularly useful in the system according to the present invention. FIG. 3a shows the situation with the ship stationary. The display 50 contains an indicator comprises of a pointer 52 which moves over a fixed scale 54 to indicate the rate-of-turn of the ship; the scale has been calibrated in degrees/minute.

The display unit 50 also contains an integrated display x comprised of a horizontal bar 56 which moves against a vertical scale 62 to indicate forward speed; a vertical bar 58 which moves against a horizontal scale to indicate lateral speed and a fixed drift angle scale which cooperates with the point of intersection 60 of the two aforementioned bars to show the angle of drift in degrees.

There is provided a selector 68 for selecting the range of the vertical and horizontal scale 62, respectively 64. In the example depicted, two alternatives are provided, i.e., if the mark 70 is opposite the mark 72, then the scales will be calibrated in high ranges and if possible, the mark 74 in low ranges. The high ranges −5 to 25 knots and ± 5 knots have been indicated in the figure, while the low ranges −1 to +5 knots and ± 1 knot are shown between brackets.

A second selector 76 is provided for selecting the location onboard the ship at which the observer wishes to know the lateral speed of the ship. In the present example three marks 80, 82 and 83 have been provided on the selector 76; by bringing one of these marks opposite the fixed mark 78 a location will be selected, for instance 80 for the bow, 82 for midships and 83 for the stern.

FIG. 3b shows what one might see with a moving ship. Forward speed is 8 knots and the current is given a starboard drift of 1.6 knots. The drift angle is 12°, so the ship's head should be brought back "on the line". The rudder has already been put to port and the ship has started to swing in the correct manner.

It will be clear from the foregoing that the servo systems 16, 18 and 36 of FIG. 2 make the indicators 56, 52 and 58, respectively, move with respect to their scales, i.e., 62, 54 and 64, respectively, that the range switch 68 will operate the scaling circuits 14 and 34 of FIG. 2, and that the selector 76 operates the switch 22 of FIG. 2.

Although in the above-described embodiment of the present invention only one lateral speed of the ship can be displayed at any one time, it will be clear that it is not the intention to restrict the invention in this respect as it will be equally possible to display a number of lateral speeds of the ship, each determined in respect of another location onboard the ship.

Figure 4:
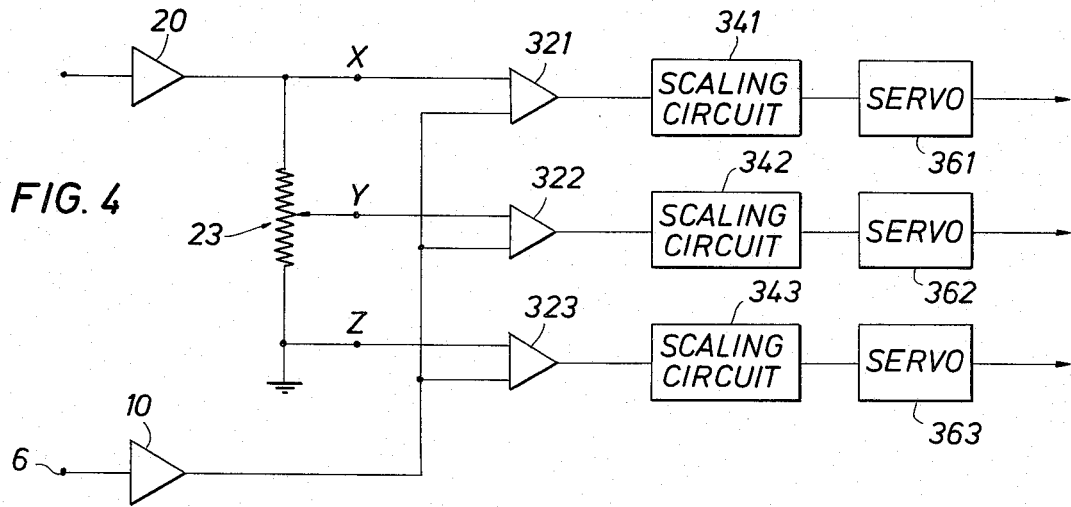
FIG. 4 shows an alternative embodiment of a part of the electronic circuitry of FIG. 1.

FIG. 4 gives an example of such an embodiment, like parts have been referred to with the same numerals as have been used with respect to FIG. 2.

The signal from the lateral speed transducer (not shown) is fed into the input 6 of the buffer amplifier 10, whose output is fed into each one of the inputs of summing amplifiers 321, 322 and 323. Each of the other inputs of these amplifiers 321, 322 and 323 is connected with a fixed position $x$, $y$ and $z$, respectively, of a potentiometer 23, which receives the signal from the output of the operational amplifier 20. The signals at the outputs of the differential amplifiers 321, 322 and 323 equal $V-L\dot{\theta}'$, $V-\frac{1}{2}L\dot{\theta}'$ and $V$ respectively and are fed via scaling circuits 341, 342 and 343 to servo amplifiers 361, 362 and 363, respectively, which at their turn will influence the display of each of these magnitudes. In this way, it will be possible to simultaneously provide the observer with the magnitudes of the lateral speed of the ship at different locations, for instance in digital form.

It will be clear from the above that it is not the intention to restrict the present invention to any type of transducer, notwithstanding the described examples. As velocity transducer any type of acoustic transducer may be suitable, as well as laser logs. Likewise, the rate-of-turn transducer based on tuning fork principle is very suitable, however, certainly not the only appropriate transducer, others such as those based on the gyroscope or laser principle may also be used.

I claim as my invention:

1. Method for determining the movement of a ship comprising:
   measuring the longitudinal and lateral velocity of the ship at an aeration-free location at the bottom of the ship;
   measuring the rate-of-turn of the ship about its vertical axis;
   generating signals representing each of the measured values;
   visually displaying the magnitude of the signal representing the longitudinal velocity as a vertical displacement of a horizontal line from a neutral horizontal axis;
   visually displaying the signal representing the lateral velocity as a horizontal displacement of a vertical line from a neutral vertical axis, said displays of longitudinal and lateral velocity being superimposed and having the same horizontal and vertical scales;
   visually displaying the magnitude of the signal representing the rate-of-turn; and
   superimposing on the display of longitudinal and lateral velocity a monogram for indicating the drift angle of the vessel resulting from the longitudinal and lateral velocities.

2. Method according to claim 1 wherein the longitudinal and the lateral velocity of the ship is measured in the area of the crest of the bow-wave of the ship.

3. A system for determining the movement of a ship comprising:
   a velocity transudcer mounted on the bottom of the ship, said transducer having at least two active elements arranged to detect the lateral and longitudinal velocity of the ship and provide signals related to the detected velocities;
   a rate-of-turn transducer mounted on the ship to detect the rate-of-turn of the ship and provide a signal related to the detected rate-of-turn;
   circuit means, said signals related to the lateral velocity and rate-of-turn being supplied to said circuit means, said circuit means supplying an output signal related to the algebraic sum of the input signals; and
   display means, said algebraic sum, lateral and longitudinal velocity signals being supplied to said display means, said display means providing a graphic display of said signals representative of the movement of the ship.

4. The system of claim 3 wherein said velocity transducer comprises two logs disposed with their axes at right angles.

5. The system of claim 3 and in addition, a second circuit means responsive to the lateral velocity signal for adjusting the value of said signal for different predetermined locations on the ship.

6. The system of claim 3 wherein said display unit includes an integrated display cross which is comprised of a horizontal bar and a vertical bar, which can move against respectively a vertical scale and a horizontal scale for indicating the longitudinal and the lateral velocity of the ship and a drift angle scale cooperating with the point of intersection of the two said bars for indicating the angle of drift of the center of gravity of the ship.

* * * * *